United States Patent [19]

Werner

[11] 4,127,310
[45] Nov. 28, 1978

[54] SHAFT BEARING AND SEAL WITH SELF-LUBRICATING SLEEVE BEARING

[75] Inventor: Otto V. Werner, Poughkeepsie, N.Y.
[73] Assignee: Ecolaire Incorporated, Malvern, Pa.
[21] Appl. No.: 830,548
[22] Filed: Sep. 6, 1977
[51] Int. Cl.² .................................... F16C 33/72
[52] U.S. Cl. ...................... 308/36.1; 92/165 R; 277/105; 308/237 R
[58] Field of Search ............... 277/105; 308/36.1, 36.2, 308/36.3, 36.4, 36.5, 237, 238, 240, 3.5, 26, DIG. 5, DIG. 7, DIG. 8, 15; 92/165, 168

[56] References Cited
U.S. PATENT DOCUMENTS

| 2,726,887 | 12/1955 | Pierotti | 308/3.5 X |
| 3,327,953 | 6/1967 | Krumholz, Sr. | 308/36.3 X |
| 3,894,256 | 7/1975 | Sholtz | 308/DIG. 5 X |

FOREIGN PATENT DOCUMENTS 124,623  4/1919  United Kingdom ............... 277/105

Primary Examiner—Trygve M. Blix
Assistant Examiner—Douglas C. Butler
Attorney, Agent, or Firm—Seidel, Gonda & Goldhammer

[57] ABSTRACT

A shaft bearing and seal in the form of a housing member having a bronze bearing press-fit into the housing member which has a counterbore for receiving packing so that the packing is confined by the counterbore and has a radial face in contact with a shoulder on the housing which extends radially outwardly from an end face of the bearing. Two studs are adapted to be welded to a frame and facilitate application of adjustment pressure to the housing member in an axial direction for compressing the packing seal against the frame.

7 Claims, 2 Drawing Figures

SHAFT BEARING AND SEAL WITH SELF-LUBRICATING SLEEVE BEARING

BACKGROUND OF THE INVENTION

A wide variety of shaft bearings and/or seals have been disclosed by the prior art. For example, see U.S. Pat. Nos. 1,955,860; 2,130,741; 2,374,960; 2,857,213 and 3,870,381. The devices disclosed in the above-mentioned prior art patents and a prior device utilized heretofore by the assignee of this invention and to be described in detail hereinafter have various disadvantages. For example, the prior art devices do not provide for at least partial pre-assembly, do not facilitate shaft alignment and/or packing seal replacement without extensive repair, while having other disadvantages such as requiring machining of the frame, requiring special tooling, etc.

The bearing seal of the present invention overcomes the above disadvantages while at the same time having advantages which do not result from the prior art constructions.

SUMMARY OF THE INVENTION

The bearing and seal of the present invention are adapted for use with a rotatable shaft which extends through an opening in a frame. The invention includes an annular housing member having a bearing force-fit along a portion of its inner periphery. The housing member has a counterbore whose diameter is greater than the outer diameter of the bearing. The counterbore defines a shoulder on the housing member radially outwardly from an end face of the bearing. An annular packing seal is disposed within and confined by the counterbore. A radial face of the packing seal is in contact with said shoulder and said end face of the bearing. Adjustable means are provided for applying pressure to the housing member for compressing the packing seal in an axial direction against the frame.

It is an object of the present invention to provide an improved structural interrelationship of components of a bearing seal so as to overcome disadvantages of the prior art while being simple, capable of partial pre-assembly, capable of facilitating shaft alignment and/or packing seal replacement without extensive repair, requiring no machining of the frame, and requiring no special tooling.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
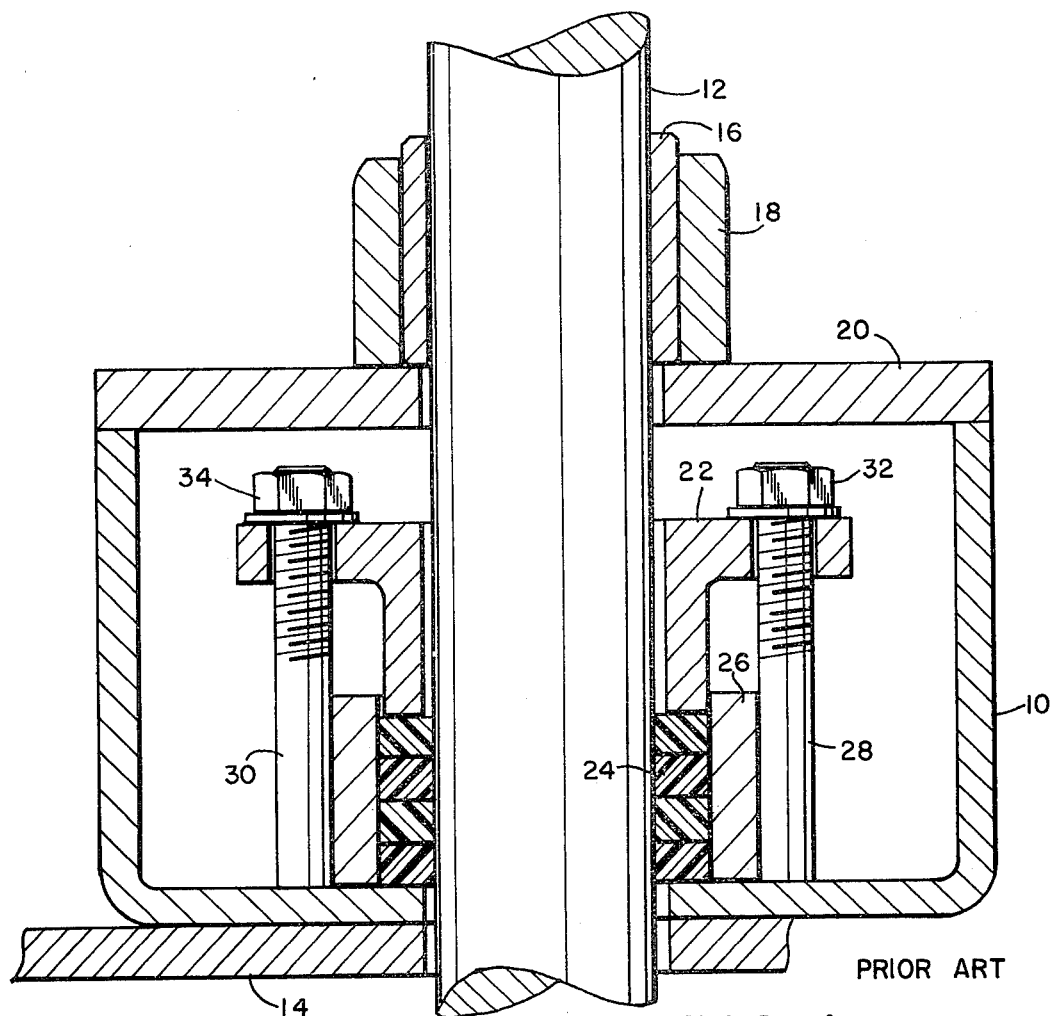
FIG. 1 is a sectional view of a prior art bearing seal of applicant's assignee.

Referring to the drawing in detail, wherein like numerals indicate like elements, there is shown in FIG. 1 a prior art stuffing box designated generally as 10. The stuffing box 10 surrounds a rotatable shaft 12 and is attached to a wall of a frame 14 in any convenient manner such as by welding. A conventional bearing 16 having a support 18 surrounds the shaft 12. The support 18 is attached to a bar 20 which overlies an open end of the stuffing box 10 and is secured thereto by means of threaded bolts not shown.

A pressure member 22 is disposed within the stuffing box 10 and surrounds the shaft 12. Member 22 has an annular boss for contact with and for application of pressure to packing seals 24. The packing seals 24 are disposed within an annular ring 26 welded at its lower end to the stuffing box 10. Studs 28 and 30 are welded to the outer periphery of ring 26. Each of the studs 28, 30 extends through a hole in a flange portion of member 22 and terminates in a nut.

Figure 2:
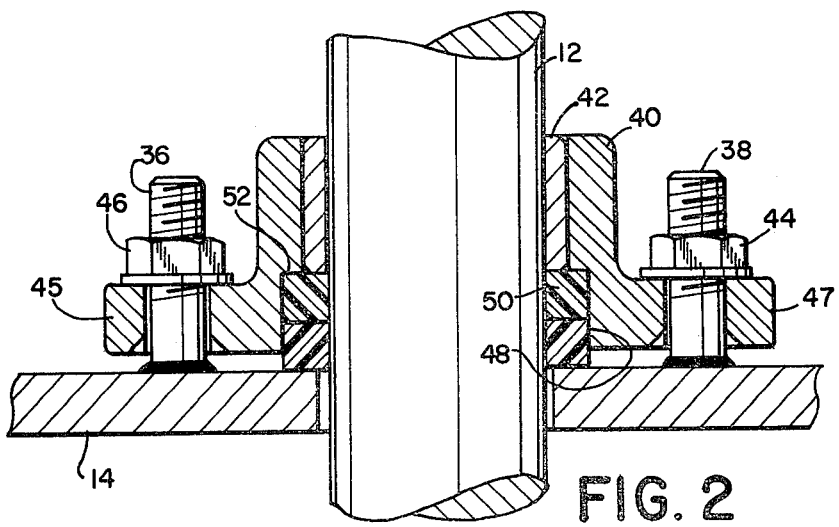
FIG. 2 is a sectional view similar to FIG. 1 but showing the bearing seal of the present invention.

The present invention for accomplishing the functions of the device in FIG. 1 is illustrated in FIG. 2. As will be readily apparent from a comparison of FIGS. 1 and 2, the present invention utilizes a fewer number of parts and takes less time to apply or remove for purposes of maintenance.

The present invention includes an annular housing member 40 preferably cast from any suitable metal. A sleeve bearing 42 is force-fit along a portion of the inner periphery of housing member 40. Bearing 42 is preferably an oil impregnated bronze bearing. A pair of studs 36, 38 are welded at one end to a face of the frame 14 on opposite sides of the opening for shaft 12. Housing member 40 is preferably cast with a pair of ears 45, 47. Each of the ears has a hole therethrough. Stud 38 extends through the hole in ear 47 and receives a threaded nut 44. Stud 36 extends through the hole in ear 45 and receives a threaded nut 46.

The housing member 40 is preferably cast with a counterbore 48 whose diameter is greater than the diameter of the bearing 42. The counterbore includes a shoulder 52 on the housing member 40 which is coextensive with and extends radially outwardly from the end face of bearing 42 at one end thereof. The other end face of bearing 42 is coextensive with an end face on the housing member 40. One or more packing seals 50 are provided within the counterbore 48 so as to be confined thereby with a radial face of packing seals 50 in contact with the juxtaposed end face of bearing 42 and shoulder 52. Packing seal 50 is compressed in an axial direction against the side face of frame 14 by use of a conventional wrench on the nuts 44, 46.

The bearing and seal of the present invention as shown in FIG. 2 is substantially simpler than prior art devices. Preassembly is facilitated by press-fitting the bearing 42 into the housing member 40 and placing the packing seals 50 within the counterbore 48. The packing seals 50 are preferably split seals so that they may be removed for purposes of maintenance and/or repair. Access to the packing seals 50 is readily attained by removing the nuts 44, 46 and sliding the housing member 40 in a direction away from the frame 14. The packing seals 50 provide a gas seal between the interior of frame 14 and the shaft 12 while at the same time facilitate slight adjustment of the housing member 40 and bearing 42 to compensate for any slight misalignment of shaft 12. In addition to acting as a bearing, bearing 42 transmits part of the force for applying pressure to the packing seals 50 in an axial direction.

The present invention provides a self-contained assembly for bearing and seal wherein the seal can be easily removed or compressed. The bearing 42 is preferably self-lubricating. Minor misalignment of the shaft 12 may be compensated for. The bearing and seal are easily pre-assembled and attached without any machining of the frame 14. The assembly may be completely disassembled without any special tools, and the packing seals 50 may be replaced. All of these advantages provide a substantial cost saving as compared with prior art devices.

The present invention may be embodied in other specific forms without departing from the spirit or essential attributes thereof and, accordingly, reference should be made to the appended claims, rather than to the foregoing specification as indicating the scope of the invention.

I claim:

1. A bearing and seal for a movable shaft adapted to extend through an opening in a stationary frame comprising an annular housing member having a bearing force-fit along the portion of its inner periphery, said housing member having a counterbore whose diameter is greater than the outer diameter of the bearing, said counterbore being at one end of said housing member and defining a shoulder on the housing member radially outwardly from an end face of the bearing, an annular packing seal means in said counterbore, the thickness of said packing seal means in an axial direction being greater than the depth of said counterbore, one side face of the packing seal means being in contact with said shoulder and in contact with said end face of the bearing, the opposite side face of said packing seal means being beyond said one end of said housing member, and adjustable means for applying pressure to the housing member for deforming said packing seal means in an axial direction against said stationary frame.

2. The bearing and seal in accordance with claim 1 wherein said adjustable means includes a pair of diametrically opposite ears on said housing member, each ear having a hole therethrough, a pair of studs, each stud being adapted to extend through one of said ear holes, a nut threaded to a stud, each stud having an end face adapted to be welded to the frame so that the studs are on opposite sides of the shaft.

3. Apparatus comprising a stationary frame having a hole therethrough, the shaft movable with respect to its longitudinal axis and extending through said hole, a bearing for said shaft, a deformable packing seal around said shaft, means for applying a pressure to said packing seal in an axial direction for deforming the packing seal into contact with said shaft comprising an annular housing member having said bearing force-fit along a portion of the inner periphery of the housing member, said housing member having a counterbore whose diameter is greater than the outer diameter of the bearing, said counterbore defining a shoulder on said housing member radially outwardly from an end face of the bearing, the packing seal being disposed within said counterbore, one side face of the packing seal being in contact with said shoulder and in contact with said end face of the bearing, and adjustable means applying pressure to the housing member and deforming an opposite side face of said packing seal in an axial direction into contact with said frame wherein the axial depth of the counterbore is less than the axial length of the packing seal 4. Apparatus in accordance with claim 3 wherein said adjustable means includes studs welded to said frame on opposite sides of said shaft, a discrete threaded nut on each stud, each nut overlying a portion of said housing member.

5. Apparatus in accordance with claim 3 wherein said bearing is a self-lubricating bearing extending from said shoulder to one end face of said housing member.

6. Apparatus in accordance with claim 3 wherein said housing member is a metal member cast with integral ears in one piece, each of the ears having a hole therethrough, said adjustment means including a pair of discrete studs, each stud extending through one of the holes in the ears and being welded to said frame.

7. Apparatus comprising a stationary frame having a hole therethrough, a shaft rotatable about its longitudinal axis and extending through said hole, a self lubricating bearing for said shaft, an annular housing member surrounding said shaft, said bearing being force-fit along the inner periphery of said housing, said housing having a counterbore at one end thereof juxtaposed to said frame, the diameter of the counterbore being greater than the outer diameter of said bearing, a deformable packing seal disposed within said counterbore, the thickness of said seal in an axial direction being greater than the axial length of the counterbore, one side face of the packing seal being in contact with said shoulder and in contact with an end face of the bearing, adjustable means applying pressure to the housing member and deforming said packing seal to contact with said frame, said adjustable means including studs welded to the frame on opposite sides of the shaft a discrete threaded nut on each stud, each nut overlying a portion of said housing, and said housing being spaced from said frame by said seal.

* * * * *